May 28, 1957  H. JUNGHANS ET AL  2,793,608
STRIKING CLOCKS
Filed July 23, 1953  7 Sheets-Sheet 3
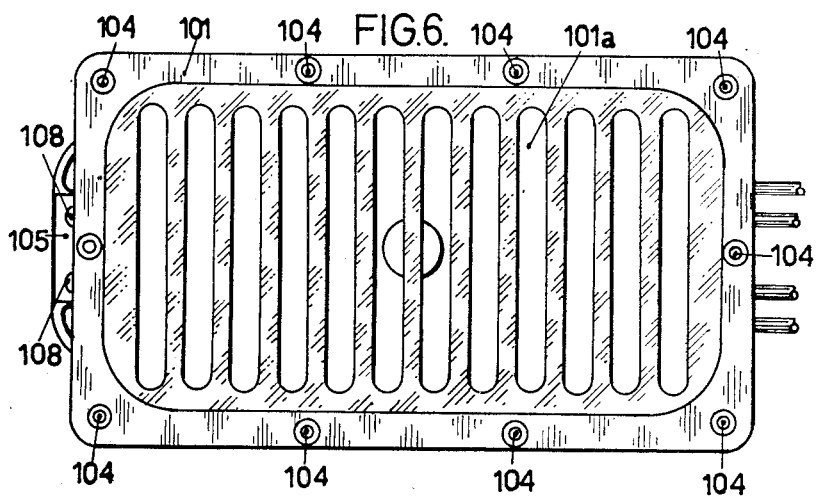
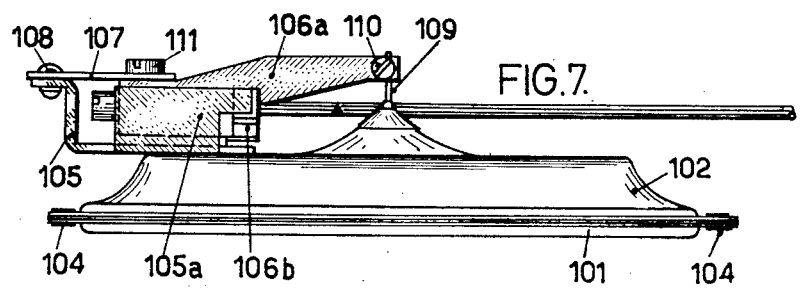
INVENTORS
Helmut Junghans
Paul Jahn
BY
Young, Ewen & Thompson
ATTORNEYS May 28, 1957  H. JUNGHANS ET AL  2,793,608
STRIKING CLOCKS
Filed July 23, 1953  7 Sheets-Sheet 4
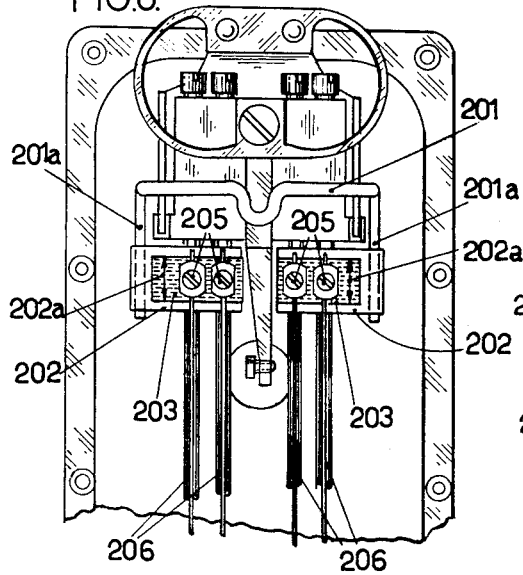
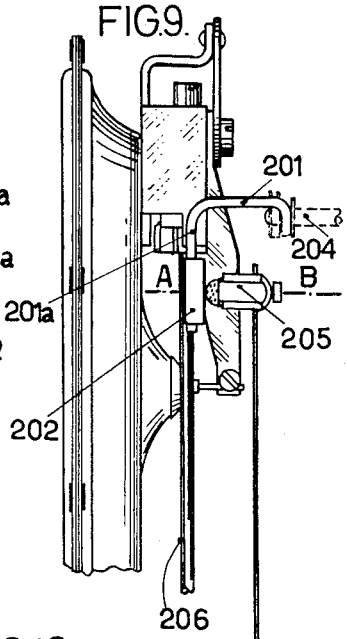
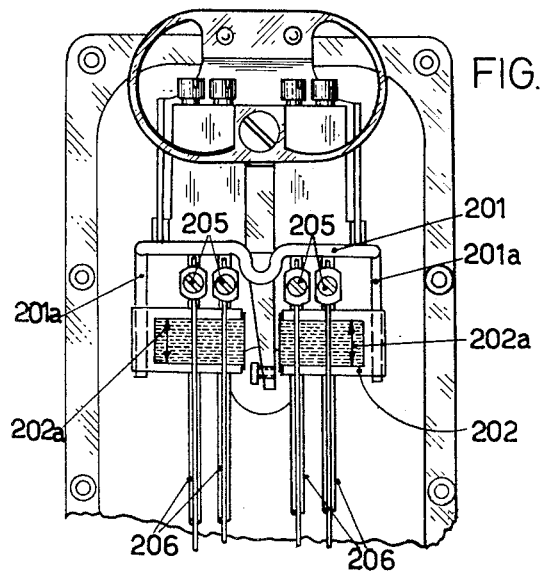
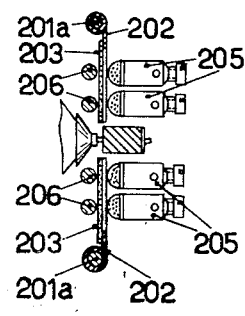
INVENTORS
Helmut Junghans
Paul Jahn
BY
Young, Emery + Thompson
ATTORNEYS

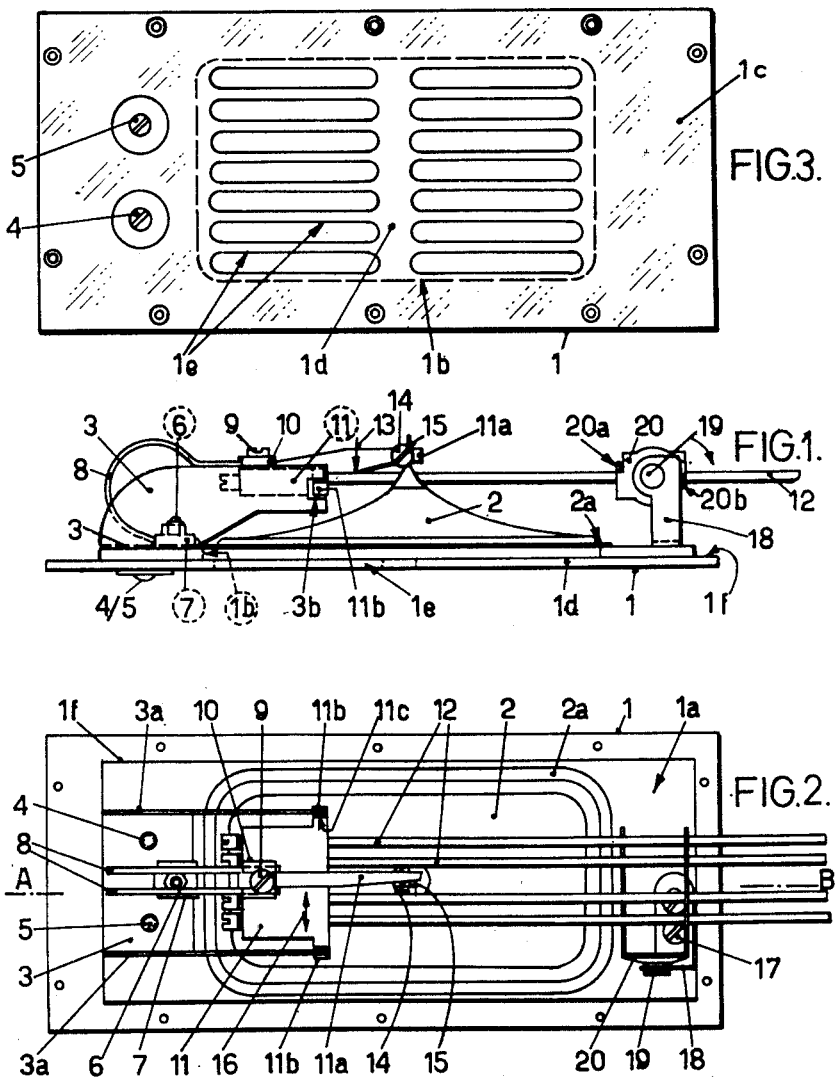

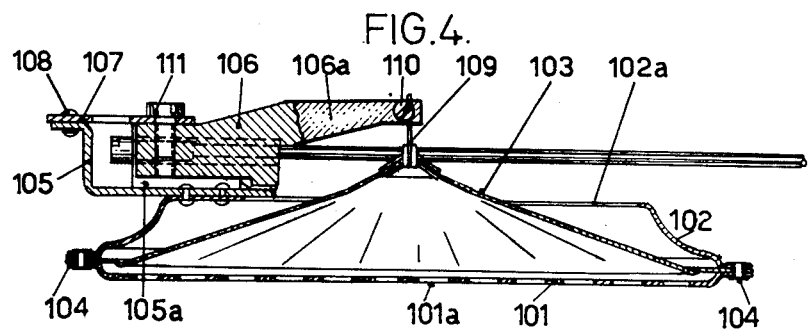
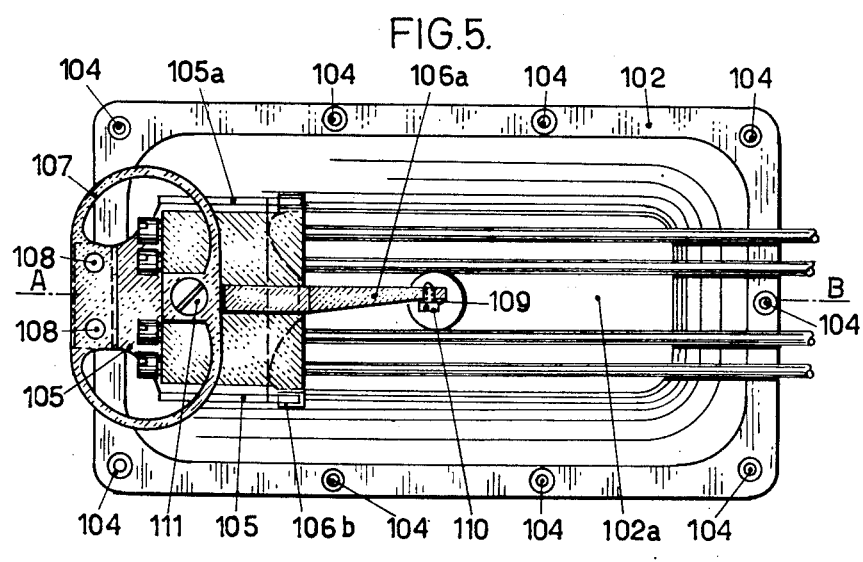

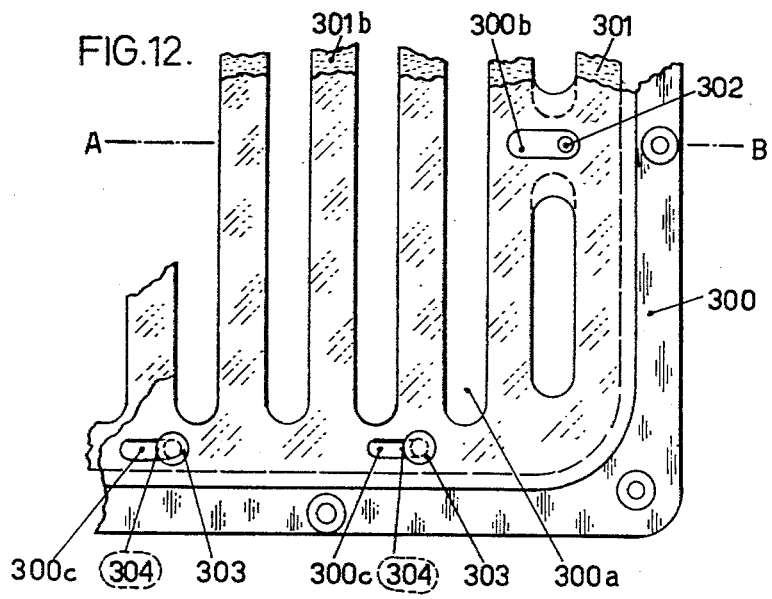
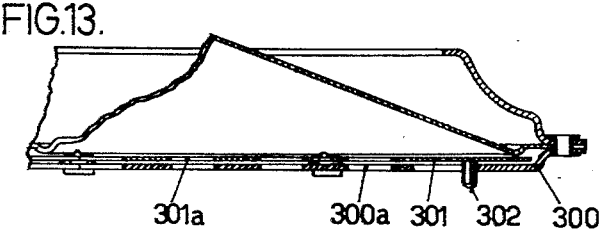

May 28, 1957  H. JUNGHANS ET AL  2,793,608
STRIKING CLOCKS
Filed July 23, 1953  7 Sheets-Sheet 6
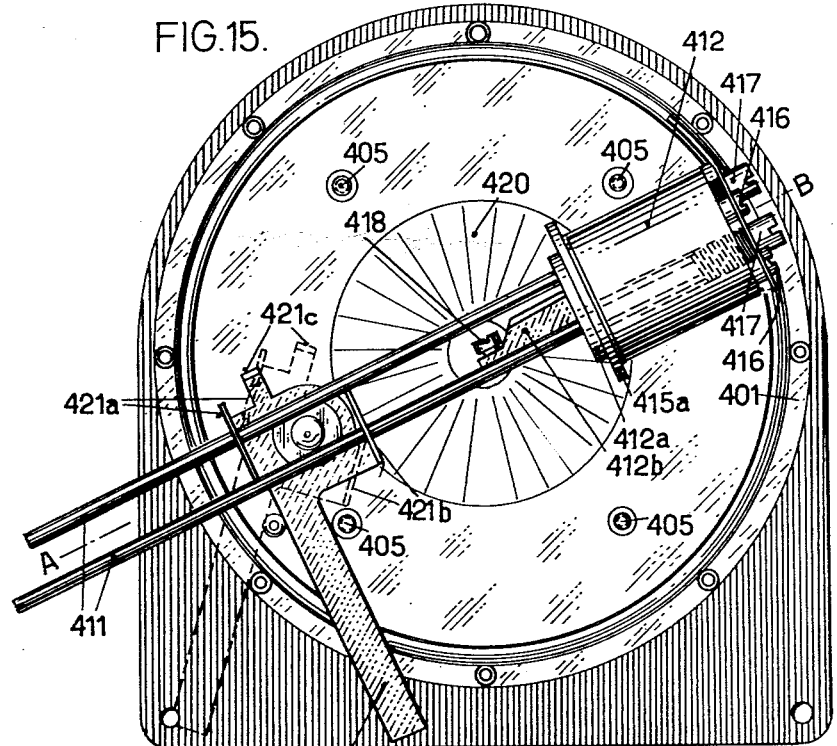
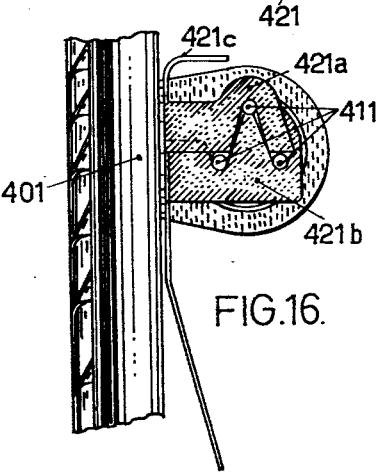
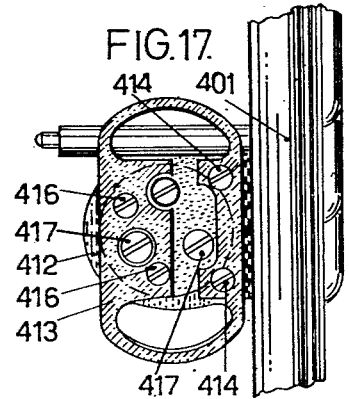
INVENTORS
Helmut Junghans
Paul Jahn
BY
Young, Emery & Thompson
ATTORNEYS

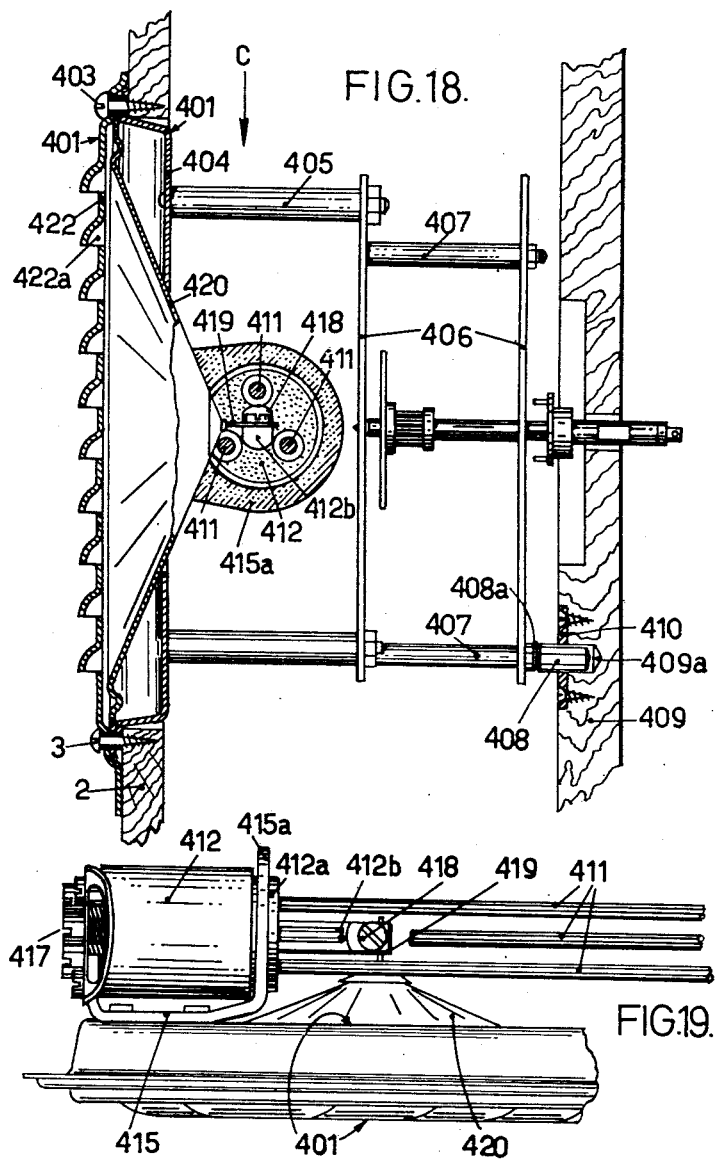

United States Patent Office 2,793,608
Patented May 28, 1957

2,793,608

STRIKING CLOCKS

Helmut Junghans, Schramberg-Sulgen, and Paul Jahn, Schramberg, Germany

Application July 23, 1953, Serial No. 369,824

Claims priority, application Germany July 26, 1952

5 Claims. (Cl. 116—169)

This invention relates to an improvement in striking clocks of the type as for instance shown and described in our application for Patent Serial No. 229,672 filed June 4, 1951.

It is an object of the invention to combine the sound member and diaphragm into an independent structural group by means of a frame holding both of them together. A further object of the invention resides in providing a structure in which all securing means in the construction are arranged on a frame, so that the complete sound apparatus forms an independent assembly capable of being fitted as a unit.

As regards the construction, it is particularly advantageous to provide the diaphragm with means to safeguard it in the best possible manner against damage, especially during installation and also during repair. For this purpose, it is a further object of the invention that the diaphragm is incorporated in a two-part housing, preferably of metal, which is provided on a sound-radiating side with suitable apertures for the outlet of sound and carries on its other half the supporting means for the gong block carrying the gong sound members.

For the purpose of producing a sound emission of adjustable intensity, a member of sound-damping material which may perhaps be inserted step-by-step, may be provided between the striking hammer and the gong sound member. For the same purpose, the half of the housing surrounding the diaphragm which permits the sound to be emitted, may consist of two plates having suitable apertures and adapted to slide relatively to one another.

More especially with relatively small clocks, such as table clocks, the diaphragm serving for the radiation of sound can be operative towards the rear wall of the clock, preferably in such manner that it completely fills the surface area of the rear wall. It is, therefore, a further object of the invention to secure the diaphragm chassis to the rear wall, which is adapted to pivot by means of hinges, it being possible for the clock mechanism to be secured to the diaphragm chassis by means of posts.

According to a further development of the invention, special safety devices are provided for transport purposes, which devices effect a locking of the various particularly effective parts of the clock, such as the clock mechanism, gong-striking mechanism, namely the gong rods and perhaps the striking hammers.

It is, therefore, another object of the invention to arrange locking means on the supporting frame, preferably in the form of fixed stops for the gong block, these stops being arranged on arms of an otherwise necessary plate which serves to support the suspension springs for the gong block.

Several embodiments of the invention are shown on the accompanying drawings, wherein:

Figs. 1 to 3 illustrate one embodiment, Fig. 1 being a longitudinal section taken on line A—B of Fig. 2, Fig. 2 is top plan view, and Fig. 3 is a bottom plan view.

Figs. 4 to 7 illustrate another embodiment of the invention in which Fig. 4 is a section taken on line A—B of Fig. 5, Fig. 5 is a top plan view, Fig. 6 is a bottom plan view, and Fig. 7 is a side elevation.

Figs. 8 to 14 illustrate further embodiments of the invention in which provision is made at the same time for regulating the intensity of the sound reproduction of the striking mechanism, of which Fig. 8 is a plan view of a striking mechanism operating with damped sound intensity, Fig. 9 is a side elevation of Fig. 8, Fig. 10 is a plan view of a striking mechanism operating with undamped sound intensity, Fig. 11 is a fragmentary elevation taken on line A—B of Fig. 8, Fig. 12 is a front elevation showing mechanism having an adjustable sound-emitting opening, Fig. 13 is a section taken on line A—B of Fig. 12, and Fig. 14 is a sectional view of a detail.

Figs. 15 to 19 illustrate the sound reproduction adjustment means in which Fig. 15 is a rear elevation, Figs. 16 and 17 are two cross sections showing various details, Fig. 18 is a sectional view taken on line A—B of Fig. 15, and Fig. 19 is a side elevation taken in the direction of the arrow C of Fig. 18.

In Figs. 1 to 3, 1 represents a plate or frame, on the inside 1a of which is secured the diaphragm 2 by means of its edge 2a. On the inside, the plate 1 comprises an opening 1b which corresponds to the opening of the conical diaphragm 2. However, the opening 1b does not extend through the plate 1, but is provided with a thin base 1d with sound apertures 1e, said base lying flush with the outside 1c of the plate.

In order to be able to fit the plate 1 with its outside surface 1c flush with the corresponding wall of the clock casing, it is formed with a fold 1f. The plate 1 could also comprise two parts, namely, the frame part containing the opening 1b and the larger base plate containing the sound apertures 1e.

Secured to the frame plate 1 by means of screws 4 and 5 is the metal plate 3 and this in turn has fixed thereon spring stirrups 8, by means of a screw 6 and a strap 7. At their other ends, the stirrups carry the gong block 11 which is also secured by a screw 9 and strap 10. The gong rods 12 are secured in a known arrangement in the gong block; they are struck in the direction of the arrow shown in Fig. 1 at 13, that is to say, perpendicular to the common plane of the gong rods. For transmitting to the diaphragm 2 the vibrations of the sound member, consisting of the gong rods 12 and the gong block 11, to the diaphragm 2 there is provided an arm 11a which is cast onto the gong block and which is rigidly connected at 14 with the diaphragm pin 15.

In order to protect the diaphragm against shocks during transport, under the action of which the gong block can carry out extremely violent vibrations, there is provided the following arrangement. Cast on to the gong block 11 are lateral lugs 11b and bent out from the plate 3 are lateral cheeks 3a which are extended as flanges as far as the lateral lugs 11b on the gong block. At this point, the ends of the flanges 3a are cut out at 3b to a greater extent than is required for a path for the lugs 11b in order that they may execute, without obstruction, the vibrations initiated by the striking of the gong hammers. Upon exceeding the described amplitudes transversely of the main plane of the diaphragm, which plane coincides with the gong rod plane and the plate plane 1, the lugs 11b meet an abutment at the opposite edges of the cut-outs 3b so that the diaphragm 2 cannot be moved excessively. Moreover, in the event of shocks during transport being in the direction of the double arrow 16 (Fig. 2), the gong block abuts with the surfaces 11c on the flanges 3a. Owing to the rigidity of the suspension springs 8, transport shocks in the direction of the gong rods are less harmful. However, a safeguard against such shocks could easily be provided by arranging in the flanges 3a openings or bores into which suitable stop pins on the gong block project.

Another possibility for providing safety in transport of the gong block would consist in arranging an arm on the plate 3 approximately at the center between the holes for the screws 4 and 5, which arm engages beneath the gong block 11 as far as the arm 11a and embraces the latter by means of a fork comprising an abutment edge, or has an opening presenting abutment edges on four sides, the arm 11a engaging through the said opening.

For securing the gong rods against shocks during transport, a bracket 18 is secured at 17 to the plate 1, a double rake 20, adapted to pivot about the pin 19, being arranged on the said bracket. By turning the double rake in the clockwise direction (Fig. 1), the rake teeth 20a and 20b engage from below and above over the gong rods and thus hold them fast.

In the embodiments of the invention as shown in Figs. 4 to 14, particular value is attached to protecting the diaphragm against damage. For this purpose, the diaphragm is built into a two-part housing which is provided towards the sound-radiating side with openings for emitting the sound and carries on its other half the supporting means for the gong block carrying the gong elements.

The metal chassis consists of two sheet metal dished members, namely, a bottom member 101 and a top member 102. The member 101 is formed with sound apertures 101a for radiating purposes. The member 102 has an opening or cut-out portion 102a as an opening for the passage of the diaphragm cone.

Despite the cut-out portion 102a, it will be seen from the drawing that the diaphragm is well protected against damage by means of the member 102. A very essential advantage and a simplification and reduction in size of the assembly consists in that the member 101, member 102 and diahpragm 103 are held together by rivets 104. The rivets 104 are in the form of hollow rivets so that these may be used at the same time as securing holes for the diaphragm and gong assembly upon being fitted into the clock casing.

The gong is also connected to the chassis, secured, for example by riveting, to the dished member 102 of the chassis a rigid sheet metal angle 105. The gong block 106 is resiliently secured to the angle member 105 by means of a spring 107. A wire spring has hitherto been proposed for this suspension, but in the present embodiment, there is employed a spring 107 stamped out of sheet metal. This spring 107 can be produced more simply and cheaply and may, for example, be secured to the angle member 105 by rivets 108. The gong block 106 is fixed to the spring 107, for example, by means of a screw 111. A diaphragm pin 109 is connected to the arm 106a of the gong block 106 by means of a screw 110.

It will be possible in this case also to provide stops on all sides of the gong block for safety in transport, this being effected due to the fact that the angle member comprises lateral flanges 105a and the gong block 106 has corresponding projections 106b.

The shape of the metal chassis or of the dished members 101 and 102 and the cut-out 102a is adapted to the shape of the diaphragm. In the example according to the drawing, the diaphragm is of rectangular form. The same arrangement can also be employed for circular diaphragms.

For the purpose of protection against dust and insects, the inside of the dished member 101 could have a sound permeable material directly secured thereon.

It is particularly expedient that the construction should be such that the intensity of the sound reproduction may be adjustable within certain limits by the user of the clock as required. Such a further development is explained with reference to Figs. 8 to 14.

Two sheet metal lugs 202 each with a recess 202a are secured to a suitably bent wire 201 or to the ends 201a thereof. Fixed to the underside of the sheet metal lugs 202 are damping elements 203 in the form of strips of cloth or the like. The wire stirrup or loop 201 is secured to a handle 204, the latter being only shown diagrammatically in Fig. 9. The mounting of the handle 204 and of the operating knob connected thereto must be adapted to the type of casing. The shaping of the wire loop 201 and the other supporting means is of secondary importance.

Instead of the wire loop, there could also be employed a loop or the like made from sheet metal. The parts 201 and 202 may also be stamped and bent out of a piece of sheet metal.

The damping element 203 adapted to be pushed between the striking hammers 205 and the gong rods 206, may be constructed to be engageable with a different thickness or softness, so that varying stages of the sound damping, such as soft, loud and medium, are reproduced. Provision may also be made for the regulation of the damping action to be controlled by a clock mechanism so that, for example, during the nights, the striking mechanism automatically only operates with a low sound intensity.

Figs. 12 to 14 show a further embodiment of the damping arrangement which is characterized by the fact that a closable slotted shutter is associated with the dished member of the metal chassis which is provided with sound apertures.

The bottom metal casing part is indicated at 300 and the sound apertures at 300a. The slotted shutter is indicated at 301.

In Figs. 12 and 13, the slotted shutter is shown in the open position, that is to say, the openings 301a thereof coincide with the sound apertures 300a, so that a full radiation or full sound intensity is obtained in the outward direction. The slotted shutter 301 is provided with a handle 302 and the casing 300 is formed with a slot 300b for guiding and limiting the movement of the handle 302. When the slotted shutter 301 is displaced towards the left by means of the handle 302 and the latter is disposed at the opposite end of the slot 300b, the sound apertures 300a are covered by the bars 301b of the slotted shutter. In this way, only a damped sound is emitted. A completely hermetic sealing by the slotted shutter 301 and a correspondingly too strong damping of the sound cannot take place, since a small air gap is provided between the slotted member 301 and the casing part 300, as shown in Fig. 14. As will be further seen from Fig. 14, the mounting is effected, for example, by rivets 303 which are guided in slots 300c of the casing part 300. A weak spring washer 304 serves as a friction member so that the slotted shutter cannot be displaced by vibration and this friction of these spring washers have a further advantage in that, due to the tensional force of the springs 304, it is not possible for the slotted shutter to rattle when the gong rods are struck. Instead of using spring washers 304, the slotted shutter could also be covered with cloth, and the cloth which would be disposed between the slotted shutter 301 and the casing part 300 would have to have the same cut-outs as the slotted shutter, that is to say, the same as the cut-outs 301a. By means of the cloth or felt covering, it would also be possible on the one hand for the friction to be reduced and on the other hand for rattling to be eliminated.

Since there is no air gap when using a felt pad between the slotted shutter 301 and the casing part 300 and in order that the damping is not too strong when the slotted shutter is closed, the slot 300b in which the actuating handle 302 is guided may be of such dimensions that the slotted shutter does not completely close the sound apertures 300a but leaves a small open gap.

By means of the damping arrangement achieved with the slotted shutter, it is also possible for the damping to be more or less strongly adjusted at will by means of the actuating member 302 without special stop posiations, such as for example soft, medium and loud. The latter can obviously also be effected by the actuating member 302 being engaged in resilient notch positions "soft, medium and loud." The latter is of advantage if the damping arrangement is frequently adjusted, for example, during the night.

Figs. 15 to 19 show a diaphragm gong which has been developed for a particularly small casing in which the space is very restricted.

The striking occurs on gong rods which are kept short in conformity with the small casing and they can be made shorter or longer according to the size of the casing.

As shown in Fig. 15, the diaphragm with metal chassis is arranged on the rear side of the table clock instead of the otherwise existing casing door. The chassis 401 is secured to the rear wall 302 of the casing by screws 403 or is adapted to hinge on said wall 402 by means of hinges. As shown in Fig. 19, posts 405 are provided secured to the rear wall 404 of the chassis 401 and the clock mechanism 406 is screwed to these posts. The clock mechanism 406 is therefore not fixed to the clock casing, which is the usual arrangement, but is fixed to the chassis of the diaphragm gong.

In order that the clock mechanism 406 fixed on the clock casing, which is the usual arrangement, but is fixed to the chassis of the diaphragm gong.

In order that the clock mechanism 406 fixed on the chassis 401 cannot yield due to lateral shocks during transport and thus bend the casing 404, a safety device is provided which consists in that one or more of the posts 407 of the clock mechanism plates have arranged thereon an extension 408 which engages in a bore 409a of the front wall 409. The bore 409a can also be formed in a small metal plate 410, especially when it is a question of inexpensive casings with also shrinkage of the wood to be expected.

The extension 408 has a groove 408a in order that it may be tightened on the screw thread. It would also be possibly to use an extension of a hexagonal or octagonal material, in which case the groove 408a would be superfluous.

When using a hinge on the metal chassis 401 (round, oval, square or rectangular metal chassis), it is possible in a preferred arrangement of the clock mechanism and of the extension 408 for the complete chassis with clock mechanism and extension 408 to be swung outwardly.

The gong rods 411 with the gong block 412 are fixed on the casing 404 of the chassis 401, this being effected resiliently by means of the stamped spring 413 (Fig. 17). The spring 413 with the screws 414 is secured to a sheet metal stirrup 415 and the gong block 412 has an attachment 412a which projects with slight clearance through an opening of the bent over lug 415a of the sheet metal stirrup 415. This arrangement serves to take up the shock during transport, that is to say, in a similar manner to the proposal which has already been made. The gong rods 411 are fixed in the gong block 412 by means of screws 417.

The gong block is provided with an extension 412b on which the diaphragm pin 419 is anchored by means of the screw 418. The diaphragm is indicated at 420.

A locking lever 421 is provided for securing the gong rods 411 and the striking hammers (not shown) during transport. It must be possible for this locking lever to be operable from outside, since when the chassis is fitted, the gong rods and the hammers are not accessible unless the chassis is provided with a hinge so that it may be swung outwardly. The locking lever 421 is extended to such a length in the downward direction that it projects somewhat through a slot in the bottom portion of the casing. The locking lever 421 is provided with two lugs 421a and 421b bent out at right angles. The lug 421a has one conical recess and the lug 421b has two conical recesses, so that when the locking lever 421 is swung inwardly (position of the lever as shown in Fig. 15), the gong rods are secured. The gong rods 411 are therefore clamped between the conical recesses and the stop points of the opposite lug (see example Fig. 16). This arrangement with the mutual support can be used since the gong rods do not lie in one plane, such as is otherwise the case with the gong of a striking mechanism.

The locking lever 421 also carries a further lug 421c which serves to secure the hammers. (In Fig. 15 in which the locking position is shown in broken lines.) The lug 421c may have riveted thereon suitable thin wires which press the hammers on to the gong rods in the locking position. The hammers are not shown in the drawing, nor are the wires riveted on to the lug.

The plates 406 of the clock mechanism (Fig. 18) may be of any desired shape, that is to say round or rectangular. It is important that the mechanism plates do not exceed a certain size so that upon inserting the complete chassis with the clock mechanism, the latter can be introduced at the same time through the opening in the rear wall. When the chassis is swung outwardly by means of a hinge, the size of the mechanism plates or clockwork mechanism must render it possible for the chassis to be swung out together with the clock mechanism. This can be effected by suitably dimensioning and shaping the mechanism plates and chassis.

In order that the clock mechanism with a balance movement or escapement can be regulated from the outside, that is to say, without dismantling or without loosening the screws 403, a front adjustment is provided. With table clocks, for example, glass faces are usually arranged on the front 409 and these serve for setting the hands. Upon opening the glass face, it is also possible for an adjusting pointer of the balance escapement, which is invisible when the face is closed, to be made accessible.

The adjustment could also be effected from the bottom of the clock by means of a vertically extending shaft which is connected by a lever transmission with the adjusting lever. The adjustment could also be effected from the back, in which case however, a regulating shaft would have to pass through the diaphragm 420. A small hole would have to be provided in the diaphragm 420 for the passage of the shaft, but in practice this hole does not impair the quality of the sound.

A closure plate 422 of the chassis preferably has rib-like apertures 422a which open downwardly so that it is difficult for descending dust to penetrate inside the diaphragm to cause damage to the diaphragm.

Since the gong rods 411 project beyond the diameter of the chassis, it is expedient, when the chassis is arranged to swing, for the hinge to be arranged on the left, when viewing Fig. 15. The free ends of the gong rods are thereby swung towards the interior of the casing.

As shown in Fig. 15, the plate 422 of the chassis 401 does not necessarily have to have a circular form like the diaphragm, but it may have for instance, a door shape which is customary with table clocks.

I claim as my invention:

1. A striking mechanism for striking clocks comprising a gong block having a plurality of gong rods, a cone-shaped diaphragm, a common holding frame to which the diaphragm and the gong block are secured so that the frame with the diaphragm and the gong block form a single unitary structure, and a two-part housing for the diaphragm, said housing being provided towards the sound radiating side with openings for the passage of sound and carries on its other side the supporting means for the gong block carrying the gong members, the bottom of that half of the diaphragm housing which is located on the sound radiating side consisting of two plates which are slidable relatively to one another and have corresponding openings for the purpose of varying the effective sound emission area and thereby render it possible for the sound emission to be regulated.

2. A striking mechanism for striking clocks comprising a gong block having a plurality of gong rods, a cone-shaped diaphragm, a common holding frame to which the diaphragm and the gong block are secured so that the frame with the diaphragm and the gong block form a single unitary structure, and a diaphragm chassis secured on the rear wall which is adapted to swing by means of hinges, the hinges being arranged at the side of the ends of the gong rods, so that when the rear wall is swung out, the gong rods will point into the interior of the casing.

3. A striking mechanism for striking clocks comprising a gong block having a plurality of gong rods, a cone-shaped diaphragm, a common holding frame to which the diaphragm and the gong block are secured so that the frame with the diaphragm and the gong block form a single unitary structure, an angle part provided by the common holding frame, a leaf spring by means of which the gong block is secured to the angle part, and cooperating contacting members to limit movement of the gong block.

4. A striking mechanism for striking clocks comprising a gong block having a plurality of gong rods, a cone-shaped diaphragm, a common holding frame to which the diaphragm and the gong block are secured so that the frame with the diaphragm and the gong block form a single unitary structure, and an oval ring-shaped leaf spring whereby the gong block is interconnected to the holding frame, said spring having strengthened parts at the long side of the oval of which one part has the gong block secured thereto and the other is secured to the holding frame.

5. A striking mechanism for striking clocks comprising a gong block having a plurality of gong rods, a cone-shaped diaphragm, a common holding frame to which the diaphragm and the gong block are secured so that the frame with the diaphragm and the gong block form a single unitary structure, and an oval ring-shaped leaf spring whereby the gong block is interconnected to the holding frame, said spring having strengthened parts at the long side of the oval of which one part has the gong block secured thereto and the other is secured to the holding frame, and the spring being arranged vertically relative to the gong rods.

References Cited in the file of this patent

UNITED STATES PATENTS

| | | |
|---|---|---|
| 2,261,345 | Demuth | Nov. 4, 1941 |

FOREIGN PATENTS

| | | |
|---|---|---|
| 453,716 | Great Britain | Sept. 17, 1936 |
| 2,362 | Great Britain | of 1911 |
| 101,945 | Sweden | July 1, 1941 |
| 259,516 | Switzerland | June 16, 1949 |
| 657,451 | France | Jan. 15, 1929 |